United States Patent
Sankaravadivelu et al.

(10) Patent No.: US 7,191,263 B2
(45) Date of Patent: Mar. 13, 2007

(54) ENHANCED INPUT USING PACKET SWITCHING OVER A PS/2 OR OTHER INTERFACE

(75) Inventors: Srinivasa M. Sankaravadivelu, Redmond, WA (US); Brien Roell, Seattle, WA (US); Brian D. Williams, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 499 days.

(21) Appl. No.: 10/812,940

(22) Filed: Mar. 31, 2004

(65) Prior Publication Data

US 2005/0223387 A1 Oct. 6, 2005

(51) Int. Cl.
G06F 3/00 (2006.01)
G06F 13/12 (2006.01)
G06F 9/455 (2006.01)

(52) U.S. Cl. .............................. 710/62; 710/5; 710/72; 710/73; 703/23; 719/321; 719/327

(58) Field of Classification Search .................. 710/5, 710/62–66; 703/23–28; 719/321, 327
See application file for complete search history.

(56) References Cited

U.S. PATENT DOCUMENTS

| | | | | |
|---|---|---|---|---|
| 5,574,891 A | * | 11/1996 | Hsu et al. | 703/24 |
| 5,754,890 A | | 5/1998 | Holmdahl et al. | |
| 5,964,853 A | * | 10/1999 | Falik et al. | 710/73 |
| 6,442,734 B1 | | 8/2002 | Hanson et al. | |
| 6,772,236 B1 | * | 8/2004 | Williams et al. | 710/19 |

OTHER PUBLICATIONS

U.S. Appl. No. 10/420,039, filed Apr. 17, 2003.
DevicetoControl <http://msdn.microsoft.com/library/en-us/devio/base/deviceiocontrol.asp?frame=true>, published prior to Mar. 31, 2004.
MOUSE_STATE <http://msdn.microsoft.com/library/en-us/intinput/hh/intinput/i8042ref_2jhu.asp?frame=true> published prior to Mar. 31, 2004.
MOUSE_INPUT_DATA <http://msdn.microsoft.com/library/en-us/intinput/hh/intinput/mref_4d6a.asp?frame=true> published prior to Mar. 31, 2004.
MouFilter_IsrHook <http://msdn.microsoft.com/library/en-us/intinput/hh/intinput/mfilref_1k4y.asp?frame=true> published prior to Mar. 31. 2004.

(Continued)

*Primary Examiner*—Kim Huynh
*Assistant Examiner*—Alan S. Chen
(74) *Attorney, Agent, or Firm*—Banner & Witcoff, Ltd.

(57) ABSTRACT

A designated byte of a PS/2 packet is used for data not recognized by a conventional PS/2 port driver. Each packet byte received by the conventional port driver is read by an Interrupt Service Routine (ISR) of a filter driver. If a received packet contains an unrecognized data type, that data is extracted. The filter driver converts the byte containing the data to 0000 0000. The port driver provides the all-zero byte to a higher level driver for processing into a subsequent data structure. A Service Callback Routine of the filter driver receives that data structure from the higher level driver. Depending upon the type of unrecognized data extracted by the ISR, that data is then either inserted into the data structure or passed independently of that data structure to a user level application.

14 Claims, 9 Drawing Sheets

OTHER PUBLICATIONS

WM_HSCROLL <http://msdn.microsoft.com/library/default.asp?url=/library/en-us/shellcc/platform/commctls/scrollbars/scrollbarreference/scrollbarmessages/wm_hscroll.asp> published prior to Mar. 31, 2004.

The PS/2 Mouse/Keyboard Protocol <http://panda.cs.ndsu.nodak.edu/~achapwes/PICmicro/PS2/ps2.htm> published prior to Mar. 31, 2004.

Keyboard scancodes: The PS/2 Mouse <http://www.win.tue.nl/~aeb/linux/kbd/scancodes-12.html> published prior to Mar. 31, 2004.

Windows and the 5-Button Wheel Mouse: <http://www.microsoft.com/whdc/hwdev/tech/input/5b_wheel.mspx> published prior to Mar. 31, 2004.

MouFilter_ServiceCallback <http://www.osr.com/ddk/intinput/mfilref_4hte.htm> published prior to Mar. 31, 2004.

Configuration of Device Objects for a Single Keyboard or a Single Mouse Device: <http://www.osr.com/ddk/intinput/km-ovr_7up3.htm> published prior to Mar. 31, 2004.

Standard keyboard and Mouse Driver Stacks: <http://www.osr.com/ddk/intinput/km-ovr_3jxj.htm> published prior to Mar. 31, 2004.

Features of the Kbfiltr and Moufiltr Drivers: <http://www.osr.com/ddk/intinput/km-ovr_2iw7.htm> published prior to Mar. 31, 2004.

Types of WDM Drivers (Kernel-Mode Driver Architecture: Windows DDK): <http://msdn.microsoft.com/library/en-us/kmarch/hh/kmarch/wdmintro_3ep3.asp?frame=true> published prior to Mar. 31, 2004.

Example WDM Device Objects: <<http://msdn.microsoft.com/library/en-us/kmarch/hh/kmarch/devobjts_4ejr.asp?frame=true> published prior to Mar. 31, 2004.

Sample Device and Driver Configuration: <http://msdn.microsoft.com/library/en-us/kmarch/hh/kmarch/wdmintro_0jon.asp?frame=true> published prior to Mar. 31, 2004.

Introduction to Device Objects: <http://msdn.microsoft.com/library/en-us/Kmarch/hh/kmarch/devobjts_4fqf.asp?frame=true> published prior to Mar. 31, 2004.

What is a Callback Function?: <http://msdn.microsoft.com/library/en-us/modcore/html/deovrwhatiscallbackfunction.asp?frame=true> published prior to Mar. 31, 2004.

* cited by examiner

|        | Bit 7 | Bit 6 | Bit 5  | Bit 4  | Bit 3 | Bit 2 | Bit 1 | Bit 0 | Description |
|--------|-------|-------|--------|--------|-------|-------|-------|-------|-------------|
| Byte 1 | 0     | 0     | y sign | x sign | 1     | M     | R     | L     | x/y signs and L/R/M buttons |
| Byte 2 | x7    | x6    | x5     | x4     | x3    | x2    | x1    | x0    | x data byte |
| Byte 3 | y7    | y6    | y5     | y4     | y3    | y2    | y1    | y0    | y data byte |
| Byte 4 | 0     | 0     | B5     | B4     | z3    | z2    | z1    | z0    | z/wheel data and buttons 4/5 |

FIG. 1
Prior Art

ENHANCED INPUT USING PACKET SWITCHING OVER A PS/2 OR OTHER INTERFACE

FIELD OF THE INVENTION

The invention generally relates to communication of data to a computer via an interface. More specifically, the invention pertains to communication to a computer of input device data of a type not supported by an existing interface, such as a standard PS/2 protocol and related software components.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Computers communicate with peripheral devices using a variety of protocols. The PS/2 device interface, originally developed by IBM, has long been used for communications between computers and input devices (e.g., mice and keyboards). In many ways, the PS/2 protocol ("PS/2") has been supplanted by the Universal Serial Bus (USB) standard. However, PS/2 devices and related hardware and software components will persist for some time to come. Many computer manufacturers, either for backward compatibility with older hardware or for other reasons, include both PS/2 and USB ports for connection to input devices. In some cases, marketing concerns may require input devices to be compatible with both PS/2 and USB ports. Consumers may not always know what type of connection is required by a particular computer, and the flexibility to connect to either interface is desired. For these and other reasons, PS/2 input devices continue to be manufactured.

A standard PS/2 data packet for a mouse is three or four bytes in length. When used in conjunction with existing PS/2 port driver software, the PS/2 packet only contains fields for limited types of data. FIG. 1 shows a standard PS/2 data packet format for a five-button mouse having a scroll wheel. The first byte is used for providing the sign (i.e., direction) of x and y movement, as well as the status of the right, middle and left buttons. The second and third bytes contain data for x and y displacement, respectively. The fourth byte is used to provide data for rotation of a scroll wheel (bits 0 through 3) and two additional buttons (bits 4 and 5). Other standard PS/2 data packet formats exist, e.g., for a mouse with no scroll wheel and for a 3-button mouse with a scroll wheel.

When developing new input devices which will communicate via a PS/2 interface, there is often a need to include features not contemplated by the PS/2 protocol, and thus not supported by many standard drivers. These new features may provide new types of input data. In particular, these features may generate data that do not correspond to the types of data for which there are reserved spaces in existing PS/2 packet formats. When a new type of data is inserted into a PS/2 packet space, existing PS/2 port drivers fail to recognize that data as distinct from the type of data normally inserted into the same space. As a result, the port driver may process the data incorrectly, and/or may provide the data to other software components without properly identifying the data type. Rewriting existing PS/2 port drivers is undesirable for various reasons. Commonly-owned U.S. patent application Ser. No. 10/420,039, titled "Attribute Reporting Over A PS/2 Protocol," filed Apr. 17, 2003 and incorporated by reference (now U.S. Pat No. 6,772,236), provides at least one solution to this problem. In particular, that application provides an approach for reporting device attributes such as battery-power state and signal strength using a PS/2 protocol.

SUMMARY OF THE INVENTION

Embodiments of the present invention provide additional ways in which input data not recognized by an existing port driver can be received via that driver and processed by a computer. According to some embodiments of the invention, a designated byte of a PS/2 packet is alternately used for (or "switched" between) two types of unrecognized input data. A conventional PS/2 port driver receives that packet and processes it as though it is a conventional PS/2 packet. Each byte of a data packet received by the port driver is read by an Interrupt Service Routine (ISR) of a filter driver. If a designated byte of a received PS/2 packet contains one of the unrecognized data types, the presence of which is signified by a flag within the designated byte, that data is extracted. The filter driver then converts the designated byte to 0000 0000 and returns that byte to the port driver. The port driver then provides the all-zero byte to a higher level driver for processing into a subsequent data structure. A Service Callback Routine of the filter driver then receives that subsequent data structure from the higher level driver. Depending upon the type of unrecognized data previously extracted by the ISR, that data is either inserted into the data structure or passed (independently of that data structure) to a specialized user level application for further processing.

In a first embodiment, the invention includes a method for processing data received from an input device through an interface. The method includes examining one or more bytes of a data packet received by a port driver and detecting the presence within the packet of data not recognized by the port driver. Unrecognized data from the packet is stored, and the portion of the packet containing the unrecognized data is replaced with a substitute value. The method further includes receiving a data structure created from the data packet, the data structure containing a value corresponding to the substitute value. Upon detecting the data structure value corresponding to the substitute value, the stored data is retrieved. Input data based on the retrieved data is then provided to at least one application program. In another embodiment, the invention includes a computer-readable medium having stored thereon instructions which, when executed by a processor, cause the processor to perform steps of the first embodiment.

In another embodiment, the invention includes a computer input device having an input control for receiving a first kind of user input. The first kind of user input has an associated data type not recognized by a port driver executing upon a computer. The input device further includes a controller communicably coupled to the input control and a memory. The memory stores instructions which, when executed by the controller, cause the controller to receive data representing a user input of the first kind, insert the received data into a portion of a data packet reserved for a specific type of data distinct from the data type associated with the first kind of user input, and transmit the data packet to the port driver.

These and other features and advantages of the present invention will be readily apparent and fully understood from the following detailed description of preferred embodiments, taken in connection with the appended drawings.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIG. 1 is a diagram of an existing format for a PS/2 data packet.

DETAILED DESCRIPTION OF THE PREFERRED EMBODIMENTS

Embodiments of the present invention are described using data structures, software architecture and other concepts of the type found in (and/or usable with) the WINDOWS XP operating system available from Microsoft Corporation of Redmond, Wash. However, the invention is not limited to such implementations, and may also be implemented in other software environments and/or using other data structures, software architecture or computing concepts. Similarly, the invention is described by example of communicating, via a PS/2 interface, data of a type not recognized by that interface. However, persons skilled in the art will appreciate that the invention includes communicating, via other types of interfaces, data not recognized by those interfaces.

General Purpose Computing Environment

Figure 2:
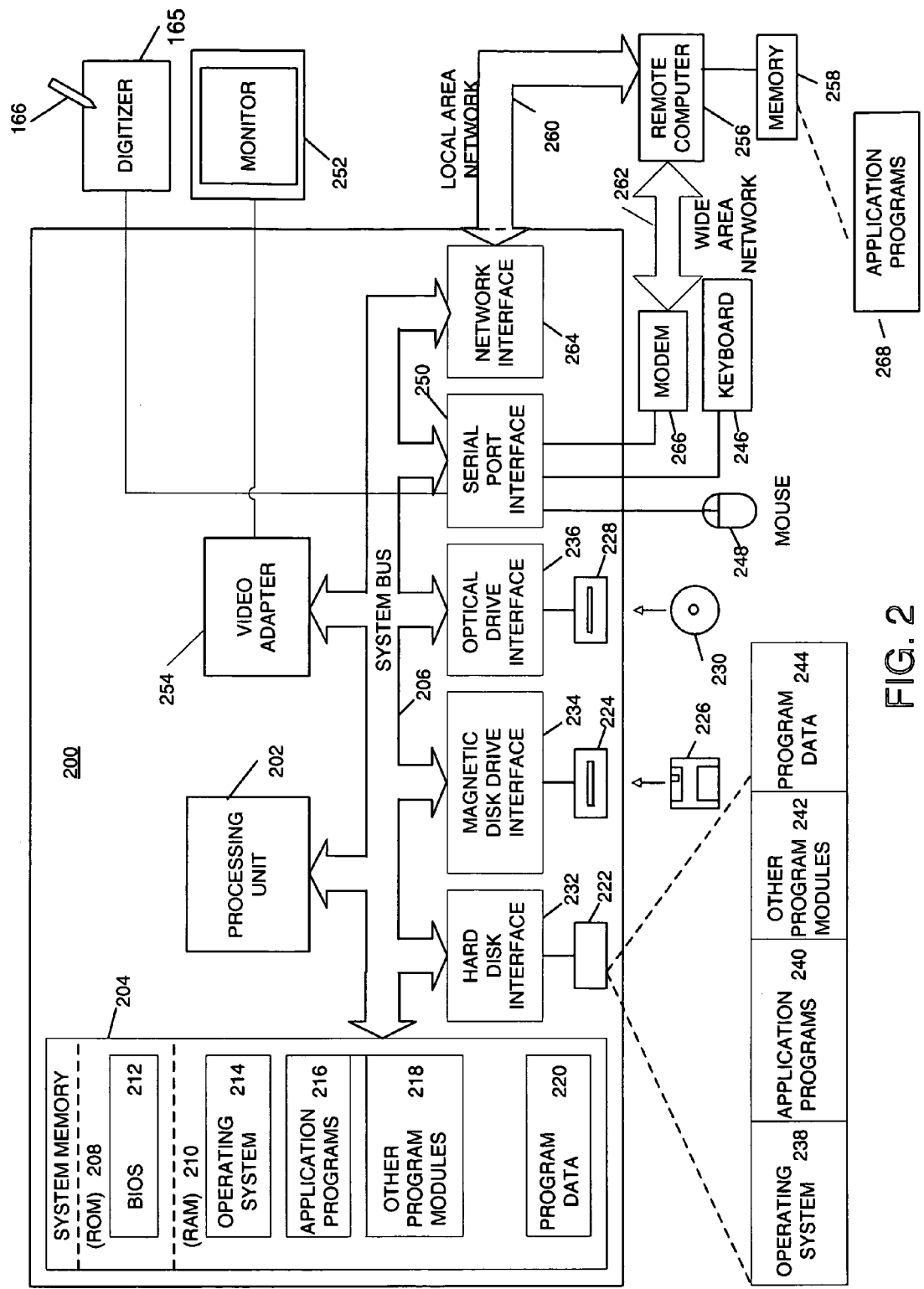
FIG. 2 is a block diagram of an example of a computing system environment in which embodiments of the invention may be implemented.

FIG. 2 illustrates an example of a suitable computing system environment 200 on which the invention may be implemented. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

The invention is operational with numerous other general purpose or special purpose computing system environments or configurations. Examples of well known computing systems, environments and/or configurations that may be suitable for use with the invention include, but are not limited to, personal computers, server computers, hand-held or laptop devices, multiprocessor systems, microprocessor-based systems, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 200. Hardware components of computer 200 may include, but are not limited to, processing unit 202, system memory 204 and system bus 206 that couples various system components (including system memory 204) to processing unit 202. System bus 206 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus also known as Mezzanine bus.

Computer 200 typically includes a variety of computer readable media. Computer readable media can be any available media that can be accessed by computer 200 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 200. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

System memory 204 includes computer storage media in the form of volatile and/or nonvolatile memory such as read only memory (ROM) 208 and random access memory (RAM) 210. Basic input/output system 212 (BIOS), containing the basic routines that help to transfer information between elements within computer 200, such as during start-up, is typically stored in ROM 208. RAM 210 typically contains data and/or program modules that are immediately accessible to and/or presently being operated on by processing unit 202. By way of example, and not limitation, FIG. 2 illustrates operating system 214, application programs 216, other program modules 218 and program data 220.

Computer 200 may also include other removable/non-removable, volatile/nonvolatile computer storage media. By way of example only, FIG. 2 illustrates hard disk drive 222 that reads from or writes to non-removable, nonvolatile magnetic media, magnetic disk drive 224 that reads from or writes to removable, nonvolatile magnetic disk 226 and optical disk drive 228 that reads from or writes to removable, nonvolatile optical disk 230 such as a CD ROM, CDRW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 222 is typically connected to system bus 206 through a non-removable memory interface such as interface 232, and magnetic disk drive 224 and optical disk drive 228 are typically connected to system bus 206 by a removable memory interface, such as interfaces 234 and 236.

The drives and their associated computer storage media, discussed above and illustrated in FIG. 2, provide storage of computer readable instructions, data structures, program modules and other data for computer 200. In FIG. 2, for example, hard disk drive 222 is illustrated as storing operating system 238, application programs 240, other program modules 242 and program data 244. Note that these components can either be the same as or different from operating system 214, application programs 216, other program modules 218 and program data 220. Operating system 238, application programs 240, other program modules 242 and program data 244 are given different numbers here to illustrate that, at a minimum, they are different copies. A user may enter commands and information into computer 200 through input devices such as keyboard 246 and pointing device 248, commonly referred to as a mouse, trackball or touch pad. Other input devices (not shown) may include a microphone, joystick, game pad, satellite dish, scanner, or the like. These and other input devices are often connected to processing unit 202 through user input interface 250 that is coupled to the system bus. Although mouse 248, keyboard 246 and modem 266 are shown in FIG. 2 as connected to computer 200 through a serial port, these and other devices may be connected to computer 200 through other ports (e.g., a parallel port, PS/2 port, game port or a universal serial bus (USB) port) and related interfaces and structures. Monitor 252 or other type of display device is also connected to system bus 206 via an interface, such as video interface 254. In addition to the monitor, computers may also include other peripheral output devices such as speakers (not shown) and a printer (not shown), which may be connected through an output peripheral interface (not shown).

Computer 200 may operate in a networked environment using logical connections to one or more remote computers, such as remote computer 256. Remote computer 256 may be a personal computer, a server, a router, a network PC, a peer device or other common network node, and typically includes many or all of the elements described above relative to computer 200, although only memory storage device 258 has been illustrated in FIG. 2. The logical connections depicted in FIG. 2 include local area network (LAN) 260 and wide area network (WAN) 262, but may also include other networks. Such networking environments are commonplace in offices, enterprise-wide computer networks, intranets and the Internet.

When used in a LAN networking environment, computer 200 is connected to LAN 260 through network interface or adapter 264. When used in a WAN networking environment, computer 200 may include modem 266 or other means for establishing communications over WAN 262, such as the Internet. Computer 200 may also access WAN 262 and/or the Internet via network interface 264. Modem 266, which may be internal or external, may be connected to system bus 206 via user input interface 250 or other appropriate mechanism. In a networked environment, program modules depicted relative to computer 200, or portions thereof, may be stored in the remote memory storage device. By way of example, and not limitation, FIG. 2 illustrates remote application programs 268 as residing on memory device 258. It will be appreciated that the network connections shown are exemplary and other means of establishing a communications link between the computers may be used.

Enhanced Input Using Packet Switching Over A PS/2 Interface

Embodiments of the invention allow processing of input, received via a PS/2 interface, which is not recognized or supported by a standard PS/2 port driver. In particular, this input is of a type not having an allocated field in a standard PS/2 data packet. When data for this input is inserted in a PS/2 packet location, a standard PS/2 port driver does not recognize the inserted data as distinct from the type of data normally placed in the same packet location. This input may also be unrecognized and/or unsupported by other operating system components, and may only be recognized by application programs in a certain form. In order to facilitate switching between PS/2 packets containing unrecognized data and PS/2 packets containing conventional data ("packet switching"), embodiments of the invention include a filter driver which reads data as it is received by the port driver. The filter driver extracts received data not recognized by the port driver. That extracted data is then used to provide input to application programs in a variety of manners, as described below.

Figure 3:
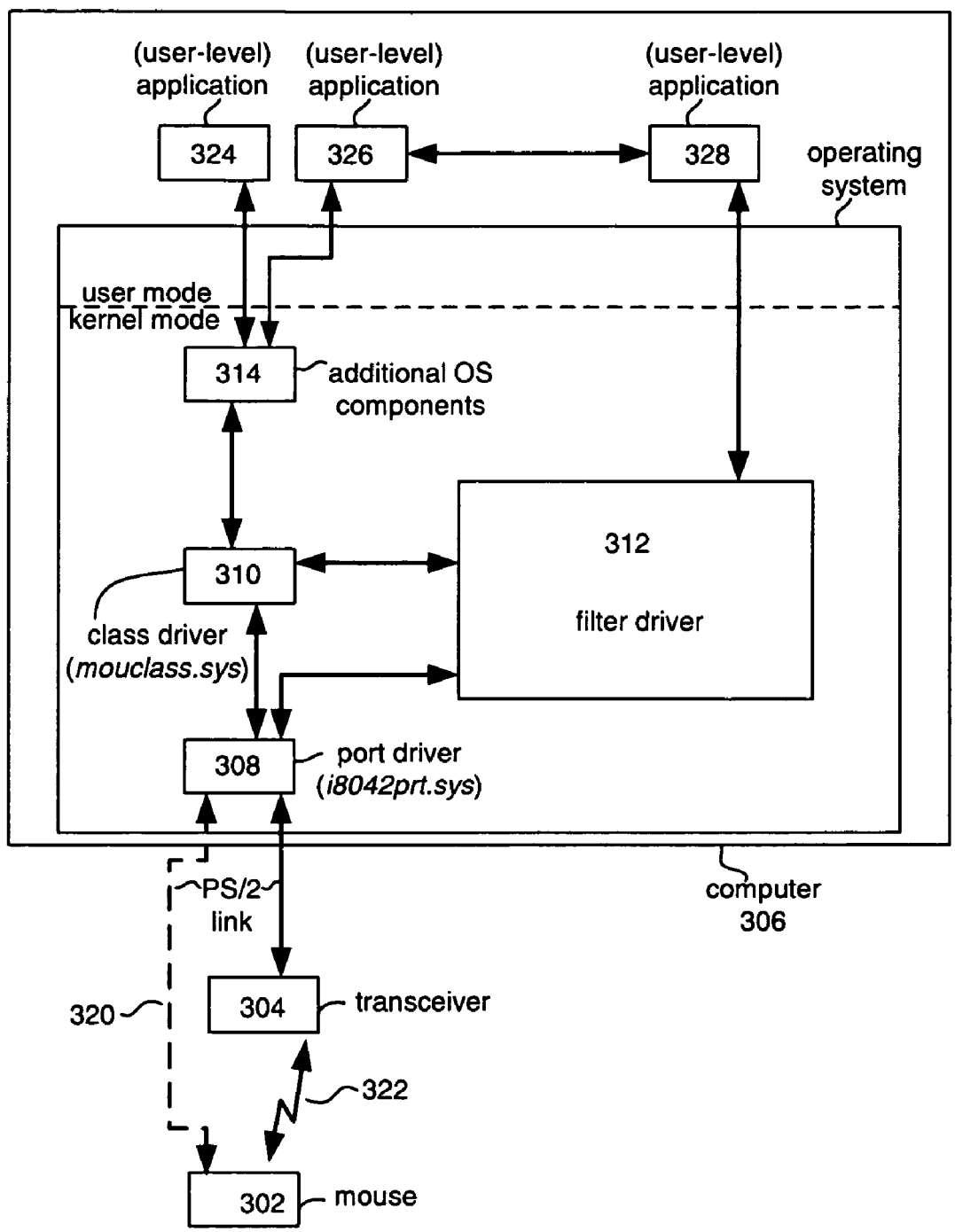
FIG. 3 is a block diagram illustrating communication between an input device and one or more user-level application programs via a PS/2 interface.

FIG. 3 is a block diagram illustrating communication between an input device and one or more user-level application programs via a PS/2 interface. Although embodiments of the invention are described using a mouse as an example, persons skilled in the art will appreciate that the invention is also applicable to keyboards and other types of input devices. Blocks 302, 304 and 306 represent hardware components, and blocks 308, 310, 312, 314, 324, 326 and 328 represent software components. Beginning at the bottom of FIG. 3, mouse 302 communicates with a computer 306. In some embodiments, mouse 302 communicates with computer 306 via a wired connection 320 (shown as a dashed line). In such embodiments, mouse 302 prepares and sends PS/2 protocol data packets to PS/2 port driver 308 (also known as an i8042 port driver). In at least some embodiments, port driver 308 is the i8042prt.sys driver of the WINDOWS XP operating system. Driver 308 may receive data packets from mouse 302 via one or more lower level bus drivers or other software components (not shown).

In other embodiments, mouse 302 communicates with computer 306 via a wireless connection 322. In particular, mouse 302 communicates by RF transmissions to and from a transceiver 304. Transceiver 304 then transmits PS/2 data packets to port driver 308 via one or more lower level bus drivers or other software components (not shown). In at least some embodiments, mouse 302 and transceiver 304 communicate via BLUETOOTH or other wireless protocol, and transceiver 304 converts wireless protocol data to PS/2 protocol data (and vice versa).

Port driver 308 provides raw data from received PS/2 packets to class driver 310 and filter driver 312. In certain embodiments, class driver 310 is the mouclass.sys driver of the WINDOWS XP operating system. Class driver 310 inserts data from port driver 308 into mouse data structures. In at least some embodiments, those data structures are MOUSE_INPUT_DATA structures of the WINDOWS XP operating system. The MOUSE_INPUT_DATA structure and related documentation is reproduced in Appendix A. Class driver 310 provides MOUSE_INPUT_DATA structures to mouse filter driver 312. Class driver 310 then receives those data structures from filter driver 312 and provides them to other operating system components 314. Those additional OS components 314 then use the MOUSE_INPUT DATA structures to generate messages for one or more application programs (e.g., 324, 326), which messages are provided via a user interface manager (e.g., user32.dll in the WINDOWS XP operating system, not shown).

As described in more detail below, mouse filter driver 312 also receives raw data from port driver 308. In some cases, this data is used to provide messages for user level application program 328, which application is able to process input from mouse 302 not supported by OS components 314, and which may not be recognized by application 324 or application 326 unless in a different form.

Figure 4A:
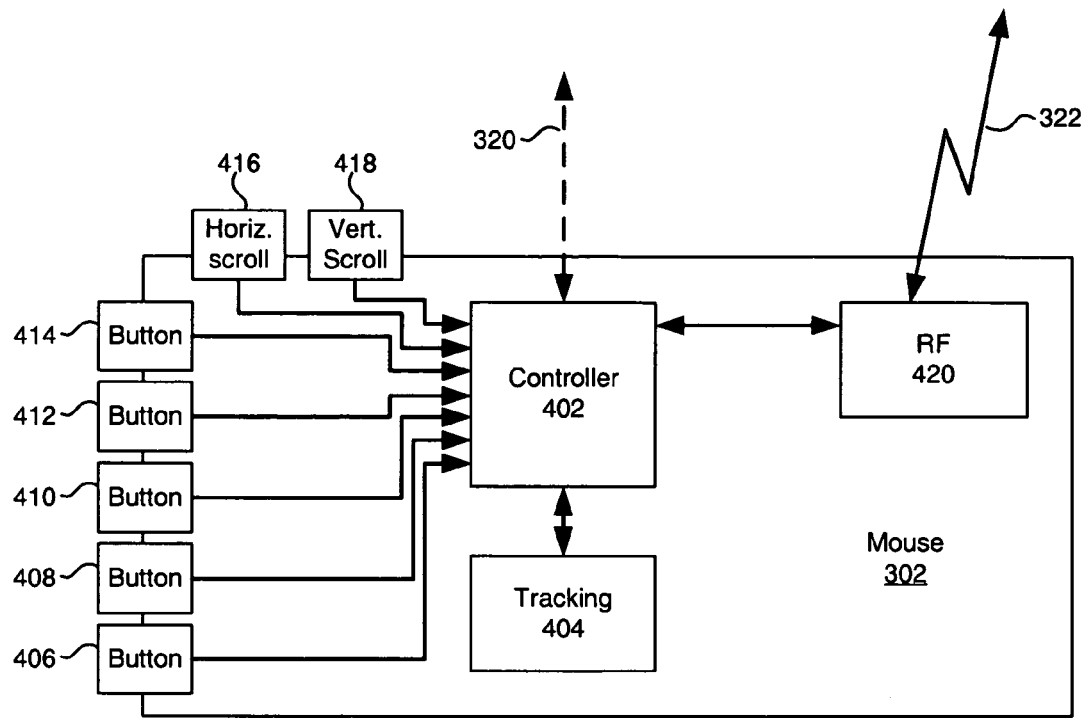
FIG. 4A is a block diagram of a mouse according to some embodiments of the invention.

FIG. 4A is a block diagram of mouse 302. Operation of mouse 302 is controlled by a controller 402. Controller 402 is a microprocessor in certain embodiments, but controller 402 could alternatively include state machine circuitry or other suitable components capable of controlling operation of mouse 302 as described herein. Controller 402 also includes one or more memories (not shown) for storage of instructions and data. Movement of mouse 302 across a desk or other work surface is encoded by tracking components 404. In at least some embodiments, tracking components 404 include an imaging array and illumination source, as well as circuitry to correlate successive images and determine mouse movement. Tracking components 404 provide encoded mouse motion data (i.e., x and y displacements) to controller 402 for transmission to computer 306. Controller 402 also receives other forms of user input. Five types of input are generated by a user pressing or releasing buttons 406–414. Another type of input is generated by a user rotating vertical scroll wheel 418. As a user turns vertical scroll wheel 418, the amount of rotation is encoded and passed to controller 402.

Another type of input is generated by horizontal scroll control 416. Similar to vertical scroll data, which may be used to move a screen image, cursor or other displayed object in a vertical direction, horizontal scroll data may be used to move an image, cursor or other object in the horizontal direction. In some embodiments, horizontal scroll control 416 is a separate wheel (or other rotating member) located on mouse 302, with horizontal scroll data corresponding to an encoded amount by which that member is rotated. In other embodiments, horizontal scroll data is generated based on the amount of user force applied to a pressure sensitive control on mouse 302. Examples of controls usable for generating horizontal scroll data are described in commonly-owned U.S. patent applications Ser. No. 10/184,000 (titled "Input Device Including A Wheel Assembly for Scrolling An Image In Multiple Directions" and filed Jun. 28, 2002) (now U.S. Pat. No. 7,079,110), Ser. No. 10/183,993 (titled "Input Device Including A Scroll Wheel Assembly for Manipulating An Image In Multiple Directions" and filed Jun. 28, 2002) (now U.S. Pat. No. 7,042,441), Ser. No. 10/183,994 (titled "Scrolling Apparatus Providing Multi-Directional Movement of An Image" and filed Jun. 28, 2002) (published as Pub. No. US 2004/0001042A1) and Ser. No. 10/382,652 (titled "Scroll Wheel Assembly for Scrolling An Image In Multiple Directions" and filed Mar. 7, 2003) (now U.S. Pat. No. 7,075,516), all of which are incorporated by reference. Although buttons 406–414, horizontal scroll control 416 and vertical scroll wheel 418 are shown as separate elements, one or more of these controls may be implemented in a combined mechanism (e.g., a scroll wheel which may also be pressed to act as a button).

Controller 402 communicates tracking data (from tacking components 404 ) and user input data (from buttons 406–414, horizontal scroll control 416 and vertical scroll wheel 418 ) to computer 306. In some embodiments, controller 402 transmits that data via wired connection 320. In at least some of these embodiments, controller 402 places that data in PS/2 protocol packets. As explained more fully below, portions of those packets are used to transmit types of data not supported by standard PS/2 protocol port drivers, and which is extracted from those packets by filter driver 312.

Figure 4B:
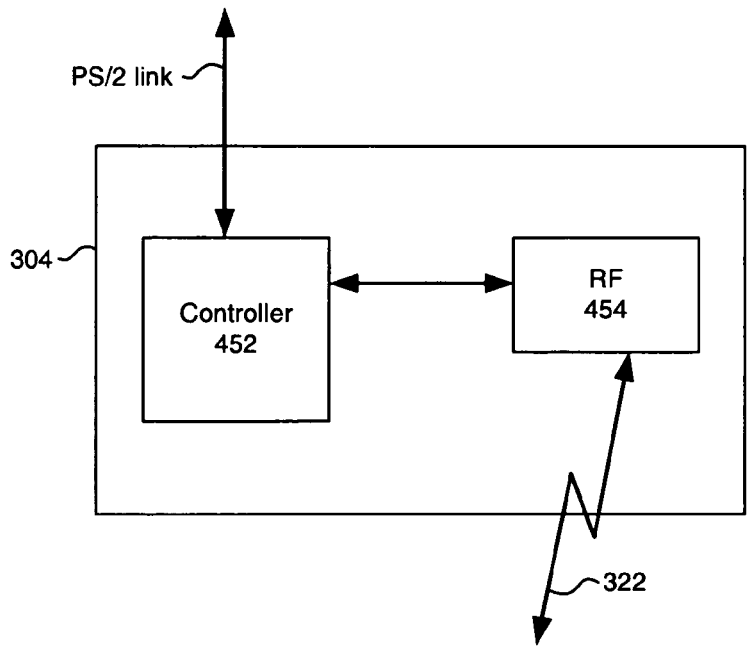
FIG. 4B is a block diagram of a transceiver according to some embodiments of the invention.

In other embodiments, that data is transmitted via RF components 420 (using a protocol other than PS/2) via wireless link 322 to transceiver 304. FIG. 4B is a block diagram of transceiver 304. Transceiver 304 includes a controller 452 for controlling the operation of transceiver 304. In some embodiments, controller 452 is a microprocessor, but controller 452 could alternately be implemented as state machine circuitry or other suitable components capable of controlling operation of transceiver 304 as described herein. Controller 452 also includes one or more memories (not shown) for storage of instructions and data. Data transmitted from mouse 302 via wireless link 322 is received by RF components 454, and provided to controller 452. Controller 452 then places the received data into one or more PS/2 format data packets for transmission to computer 306 via a PS/2 link.

As shown in FIG. 1, bytes 2 and 3 of a standard PS/2 data packet for a five-button mouse are used for the x and y displacements corresponding to mouse movement over a desk or other surface. Byte 1 is used for the sign of the x and y data, as well as for the status of the right, middle and left mouse buttons. The remaining byte (number 4) is used for the status of two additional mouse buttons (buttons 4 and 5), as well as for the scroll wheel data. No byte is set aside for horizontal scrolling data. In order to transmit horizontal scroll data from mouse 302 using a standard format PS/2 data packet, that data must be placed somewhere within one of the four existing bytes. In other words, the horizontal scroll data must be inserted into one or more fields of the packet reserved for other data types.

In the data packet of FIG. 1, only 4 bits of the fourth byte are used for vertical scroll data. For relatively low resolution, this is acceptable. In particular, the vertical scroll data corresponds to an amount by which the scroll wheel has been moved in an up or down direction since the last data packet. Once a predetermined amount of scroll wheel movement has been reported, the screen display is scrolled a predetermined amount. For at least some examples of low resolution scrolling, this means that the screen display moves in relatively large increments (e.g., several lines at a time) once the scroll wheel has rotated a predetermined number of units (or "counts") in a particular direction. For wheel rotations of less than that predetermined number of counts, no scrolling occurs on the screen. For higher resolution scrolling, the screen display moves in smaller increments, e.g., the screen scrolls fewer lines (or even sub-lines or pixels) once the scroll wheel has rotated a smaller number of counts. This permits a user to have a finer degree of control over scrolling. For higher resolution scrolling, however, more than four bits of scroll data is often useful.

According to at least some embodiments of the invention, the fourth byte of a PS/2 packet is alternately used for (or "switched" between) horizontal scroll data and high resolution vertical scroll data. A conventional PS/2 port driver receives that packet and processes it as though it is a conventional PS/2 packet. Because a standard PS/2 port driver is not designed to distinguish between the types of data the fourth packet may contain (and is not designed to interpret data as either high resolution vertical scroll data or horizontal scroll data), each byte of a data packet received by the port driver is read by an Interrupt Service Routine (ISR) of a specially-written mouse filter driver. If the fourth byte of a received PS/2 packet contains horizontal scroll or high resolution vertical scroll data, the presence of which is signified by a flag within the fourth byte, that data is extracted from the fourth byte. The filter driver then converts the fourth byte to 0000 0000 and returns that byte to the port driver. The port driver then provides the all-zero byte to a standard mouse class driver (e.g., mouclass.sys) for processing into a MOUSE_INPUT_DATA structure. A Service Callback Routine of the filter driver then receives the MOUSE_INPUT_DATA structure from the class driver. If high resolution vertical scroll data was extracted by the ISR, that data is inserted into the MOUSE_INPUT_DATA structure by the Service Callback Routine. If horizontal scroll data was extracted by the ISR, the Service Callback Routine passes that data (independently of a MOUSE_INPUT_DATA structure) to a specialized user level application for further processing.

Figure 5:
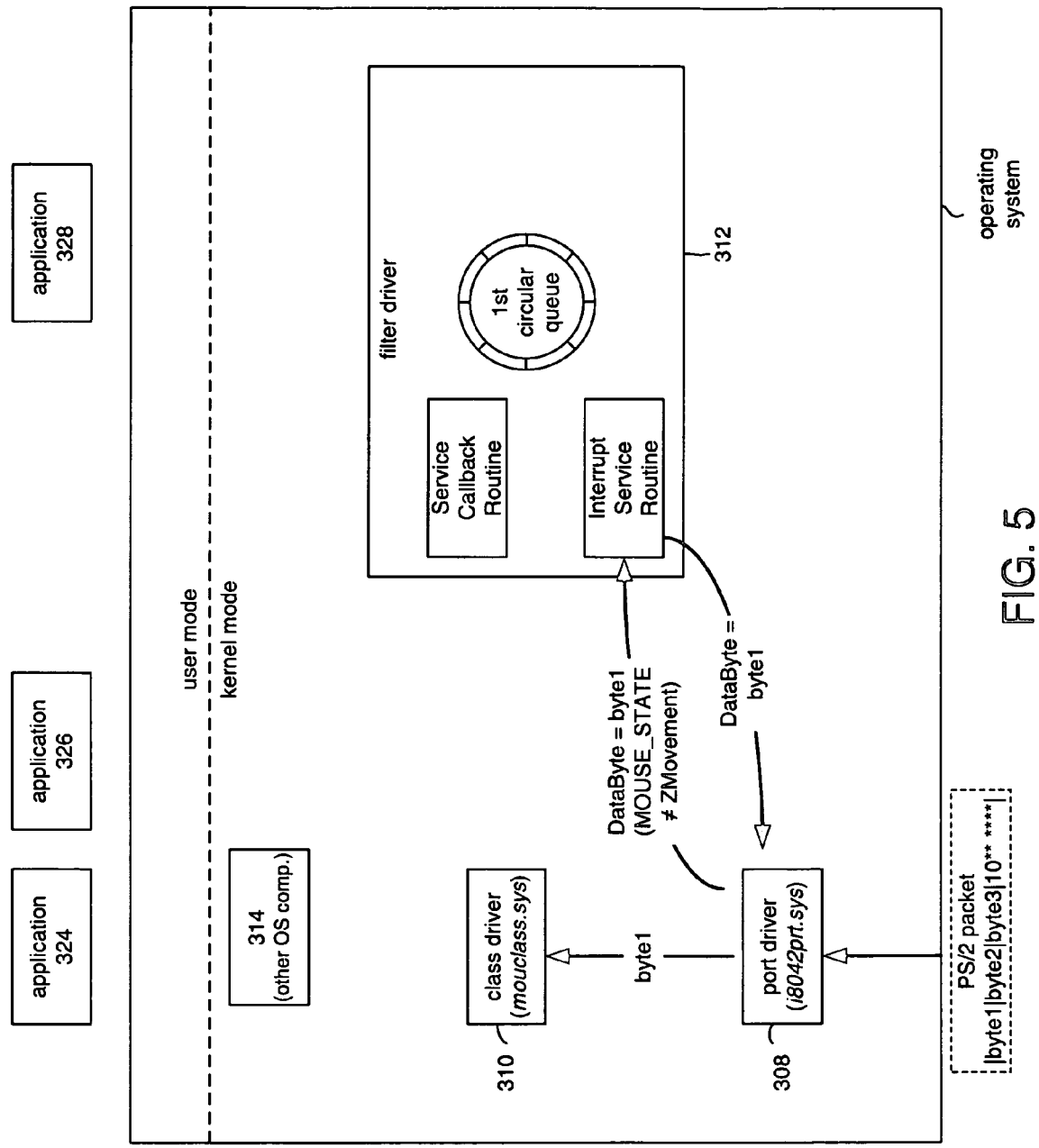
FIG. 5 is a block diagram illustrating communication between operating system components according to at least some embodiments of the invention.

The above treatment of horizontal and high-resolution vertical scroll data is explained in more detail in connection with FIGS. 5 through 9. Beginning with FIG. 5, a PS/2 mouse packet is received by port driver 308. In the example of FIG. 5, the packet contains high resolution vertical scroll data in byte 4. Unlike the packet of FIG. 1, where the two most significant bits are always set to 0, the two high order bits of byte 4 in FIG. 5 are used as a flag to indicate the type of data contained in the remaining six bits. In at least one embodiment, a value of "10" in the two high order bits indicates that the remaining six bits contain high resolution vertical scroll data. As the PS/2 packet is received by port driver 308, the ISR of filter driver 312 reads the raw data for each byte of the packet. In at least one embodiment, a hook callback function of the ISR of filter driver 312 registers to receive raw data from port driver 308. Port driver 308 then calls that registered hook callback function for each byte of a PS/2 packet in any mouse-to-computer communication. In other words, after port driver 308 receives a byte of a PS/2 packet, port driver 308 calls the hook callback function. Port driver then waits for the return (or completion) of that hook callback function before continuing to process that byte. In at least one embodiment, that hook callback function follows the MouFilter_IsrHook template of the WINDOWS XP operating system, which template is reproduced at Appendix B.

With each call to the ISR callback routine, various parameters are passed to the ISR of filter driver 312. A MOUSE_STATE parameter (reproduced at Appendix C) indicates the current state of the mouse. A MOUSE_RESET_SUBSTATE parameter indicates a substate of the mouse if it is currently being reset; otherwise the parameter does not contain a meaningful value. As explained in more detail below, the reset substate of the mouse is relevant in at least some embodiments when the mouse is to be configured for packet switching. A DataByte parameter specifies the data byte received from the mouse when port driver 308 called the ISR callback routine. Until MOUSE_STATE contains a value of "ZMovement" (signifying that port driver 308 has received the fourth byte of a PS/2 packet), the ISR of filter driver 312 simply reads each received data byte and returns that byte unchanged to port driver 308. In FIG. 5, the first byte of the PS/2 packet does not correspond to a MOUSE_ STATE value of ZMovement, and the value of byte 1 is returned (unchanged) by the ISR to port driver 308. Port driver 308 then provides the value of byte 1 to class driver 310. Although not shown in the drawings, a similar pattern is then followed with regard to bytes 2 and 3.

Figure 6:
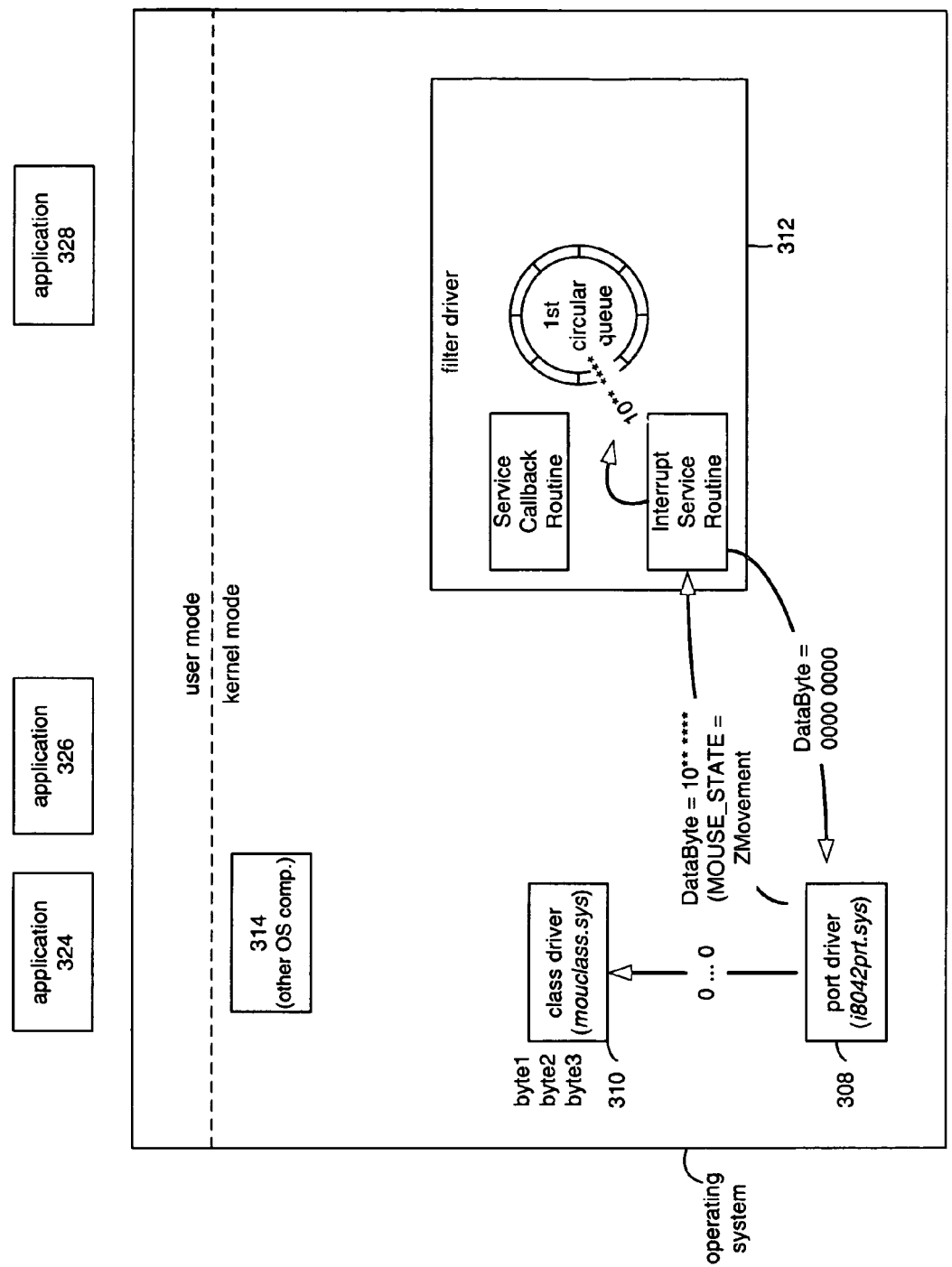
FIG. 6 is a block diagram illustrating communication between operating system components according to at least some embodiments of the invention.

Upon receiving the fourth byte of the PS/2 packet, and as shown in FIG. 6, port driver 308 calls the ISR callback routine with a value for MOUSE_STATE equal to ZMovement, and a DataByte value beginning with "10"; the remaining six bits of the fourth byte are shown with asterisks to represent arbitrary values. Based on the MOUSE_STATE value, the ISR of filter driver 312 knows that the corresponding raw data is for a packet position normally used for vertical scroll data. The ISR then determines whether the two high order bits flag use of the fourth byte for a non-standard data type. In at least one embodiment, a value of "10" or "01" operates as such a flag. A flag value of "10" indicates that the byte represents high resolution vertical scroll data, and "01" indicates that the byte represents horizontal scroll data. In the example of FIG. 6, the ISR recognizes a "10" and copies the data to a first circular queue. The ISR then sets the value of DataByte to 0000 0000, and returns that value to port driver 308. Port driver 308 then passes the all-zero fourth data byte to class driver 310 (which has previously received bytes 1–3 ).

Figure 7:
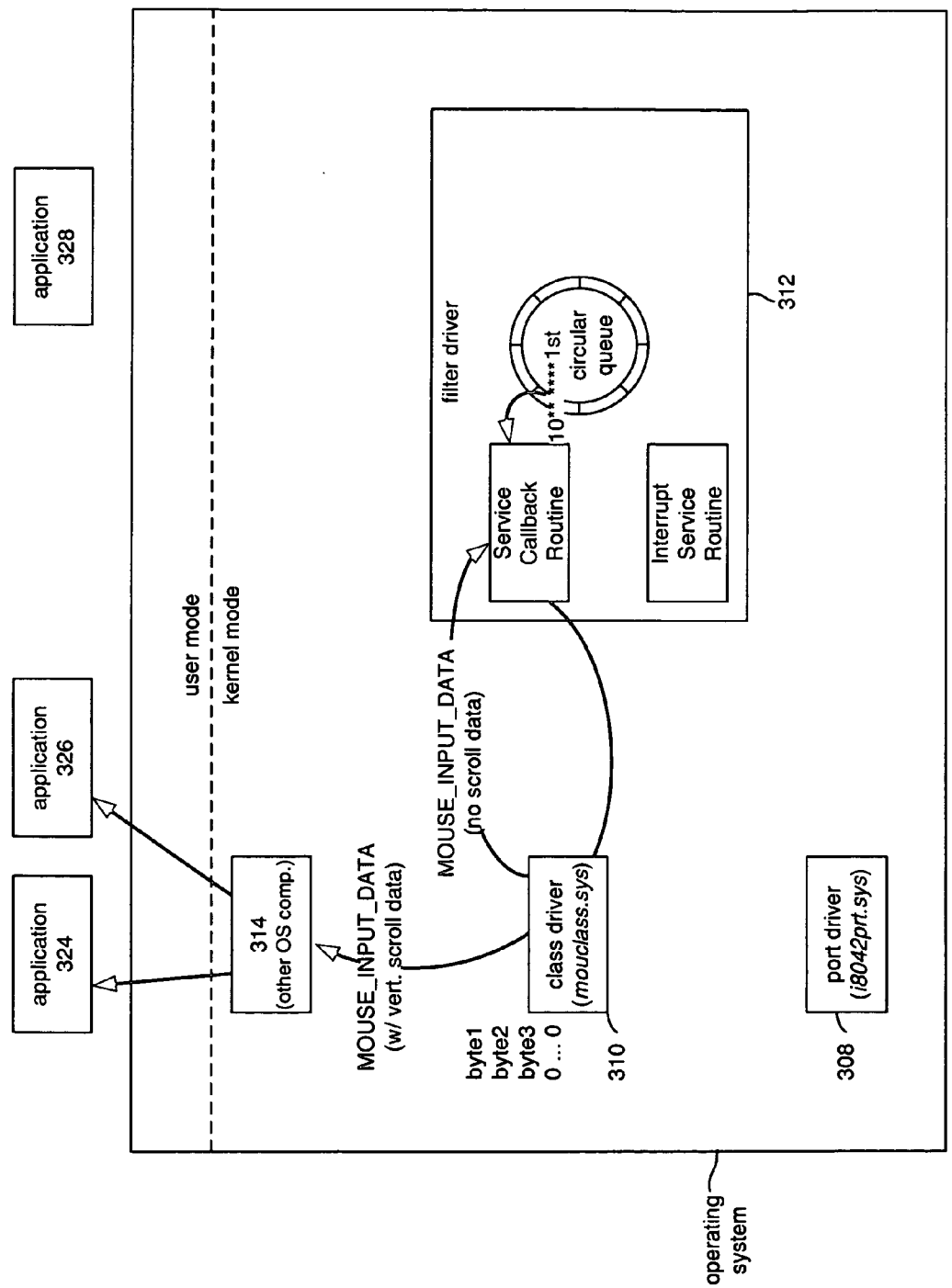
FIG. 7 is a block diagram illustrating communication between operating system components and application software according to at least some embodiments of the invention.

In FIG. 7, class driver 310 (which has now received four bytes of data for a PS/2 packet) creates a MOUSE_INPUT_DATA structure and provides that structure to a Service Callback Routine of filter driver 312. The structure may contain button data for buttons 1–3 (from byte 1), x displacement data (from byte 2) and/or y displacement data (from byte 3). Because byte 4 was reset to 0000 0000 by the ISR, the structure will not have the vertical scroll data initially received by port driver 308. Upon receiving the MOUSE_INPUT_DATA structure, the Service Callback Routine of filter driver 312 checks the ButtonData field of the MOUSE_INPUT_DATA structure. The ButtonData field, which is used for "Z" or vertical scroll wheel data, will also be all-zero if the $MOUSE_{13}$ INPUT_DATA structure was created using a packet with a fourth byte of 0000 0000. If the ButtonData field is all-zero, the Service Callback Routine checks the first circular queue for data placed in that queue by the ISR. If there is data in the queue, the Service Callback Routine retrieves it. In at least some embodiments implemented using the WINDOWS XP operating system, the circular queue is stored in a kernel device object. The queue is thus unique to each device, and each hardware device object has its own queue. If more than one mouse is in communication with computer 306, each mouse would have its own circular queue. The circular queue is protected within the Service Callback Function by providing a function within the Service Callback Function that is raised to the same IRQL (interrupt request level) as the ISR using a call to the KeSynchronizeExecution routine. In this manner, the Service Callback routine will not be interrupted when accessing the circular queue. The circular queue need not be protected within the ISR, as the ISR is running at an elevated IRQL and cannot be interrupted.

After retrieving data from the circular queue, the Service Callback Routine determines whether that data is vertical scroll data or horizontal scroll data. In FIG. 7, the data is vertical scroll data. Because the MOUSE_INPUT_DATA structure already contains a field for vertical scroll data (ButtonData), the Service Callback Routine places vertical scroll data in the MOUSE_INPUT_DATA structure and adds a MOUSE_WHEEL flag to the ButtonFlags member of the structure to indicate the presence of vertical scrolling data. In at least some embodiments, the Service Callback Routine converts vertical scroll data from the first circular queue to a 16-bit signed value, multiplies that value by (−120), and places the resulting value into the ButtonData field of the MOUSE_INPUT_DATA structure. The Service Callback Routine then returns the MOUSE_INPUT_DATA structure to class driver 310. Class driver 310 then forwards the MOUSE_INPUT_DATA structure to additional OS components 314, where the structure is used to create one or more messages for application 324 or application 326 (depending upon which application is in the foreground) containing the vertical scrolling information from the Service Callback Routine.

Figure 8:
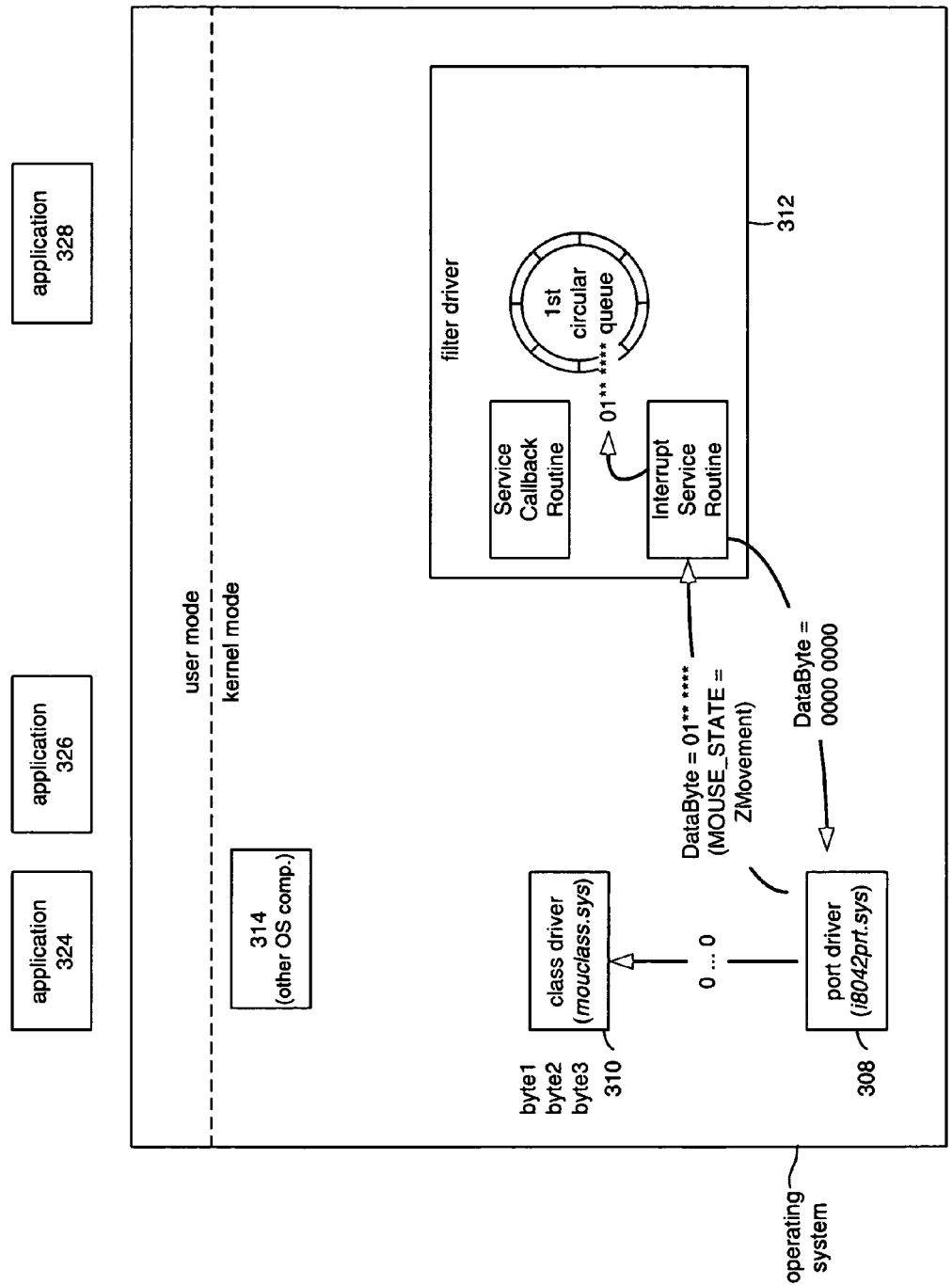
FIG. 8 is a block diagram illustrating communication between operating system components according to at least some embodiments of the invention.
Figure 9:
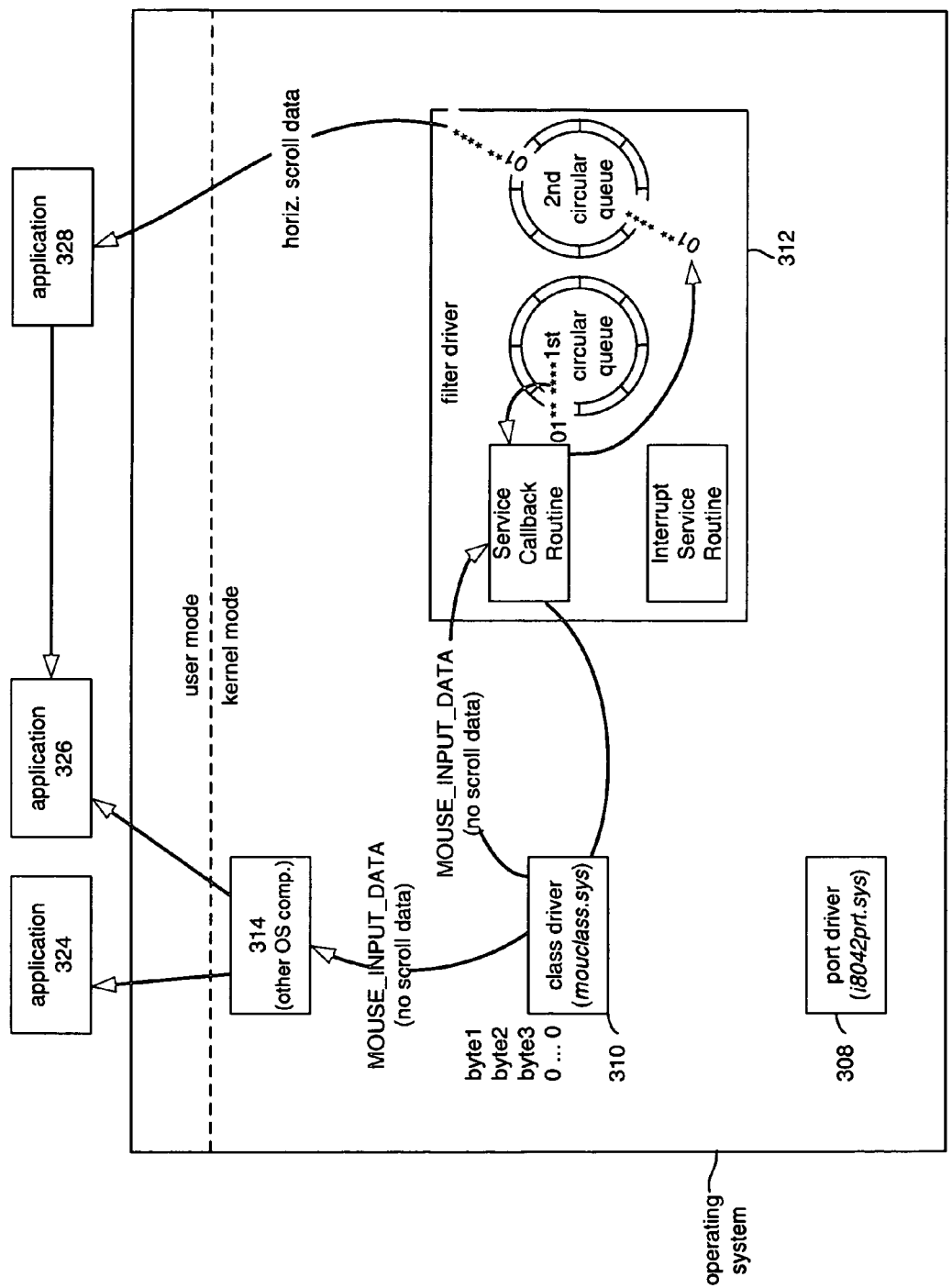
FIG. 9 is a block diagram illustrating communication between operating system components and application software according to at least some embodiments of the invention.

FIGS. 8 and 9 illustrate processing of horizontal scroll data. In FIG. 8, port driver 308 has previously received 3 bytes of the PS/2 packet shown in parenthesis in FIG. 8. Upon receiving the fourth byte of that packet (01 ), port driver 308 calls the ISR callback routine with a value for MOUSE_STATE equal to ZMovement, and a DataByte value of "01 **." Based on the MOUSE_STATE value, the ISR of filter driver 312 knows that the corresponding raw data is for the packet position normally used for vertical scroll data. Based on the two high order bits, the ISR then determines that the byte contains non-standard data (in this case, horizontal scroll data). As in FIG. 6, the ISR copies that data to the first circular queue. The ISR then sets the value of DataByte to 0000 0000, and returns that value to port driver 308. Port driver 308 then passes the all-zero data byte to class driver 310**, which has previously received bytes 1–3.

In FIG. 9, class driver 310 creates a MOUSE_INPUT_DATA structure and provides that structure to the Service Callback Routine of filter driver 312. As before, the structure may contain button data for buttons 1–3 (from byte 1), x displacement data (from byte 2) and/or y displacement data (from byte 3). Upon receiving the MOUSE_INPUT_DATA structure and finding an all-zero value in the ButtonData field (byte 4 having been reset to 0000 0000 by the ISR), the Service Callback Routine checks the first circular queue for data. Upon retrieving that data, the Service Callback Routine recognizes the data as horizontal scroll data.

Unlike vertical scroll data, the MOUSE_INPUT_DATA structure does not have a portion set aside for holding horizontal scroll data. If, for example, the horizontal scroll data was simply placed in the ButtonData field and the MOUSE_WHEEL flag added to ButtonFlags, one or more of the other OS components 314 would misinterpret that data as vertical scroll data. Overcoming this problem would require revision of OS components 314 and/or class driver 310. Even if this problem were overcome and messages containing horizontal scroll data were generated by OS components 314 for a foreground application, the application may not understand the message. In particular, many pre-existing applications have not been designed to receive horizontal scroll data from a separate mouse control. In many cases, an application will only allow horizontal scrolling by positioning a cursor over a horizontal scroll bar on a display screen, pressing a mouse button, and then moving the mouse. If the mouse has a separate wheel or other control for horizontal scrolling, the application will not understand data from that control.

Therefore, and according to at least some embodiments of the invention, filter driver 312 provides horizontal scroll data to user-level applications via an intermediate user-level application 328. Upon receiving a MOUSE_INPUT_DATA structure and determining that corresponding data in the first circular queue is horizontal scroll data, the Service Callback Routine transfers that data to a second circular queue. The Service Callback Routine further returns the MOUSE_INPUT_DATA structure to class driver 310 without change (i.e., no scroll data is added). The second circular queue is protected so as to handle asynchronous IOCTL calls. Filter driver 312 then notifies application 328 that horizontal scroll data exists and needs to be processed. In particular, filter driver 312 signals application 328 using an Event. User-level application 328 listens for various types of Events. When an Event associated with horizontal scroll data is signaled by filter driver 312, application 328 accesses filter driver 312 and requests the horizontal scroll data. In at least some embodiments implemented using the WINDOWS XP operating system, application 328 uses a DeviceIOControl call to ask filter driver 312 for particular data. Information about the DeviceIOControl call is reproduced at Appendix D. As part of the DeviceIOControl call, application 328 sends to filter driver 312 a data structure in which the horizontal scroll data is to be stored. Filter driver 312 receives the DeviceIOControl call, takes the provided data structure from the call, accesses the second circular queue, and places the horizontal scroll data in the data structure. The data structure is then returned to application 328. Application 328, which is aware of other user-level applications (e.g., applications 324 and 326), then sends horizontal scroll data to one or more user level applications. In at least some embodiments, application 328 determines which application is currently in the foreground and sends horizontal scroll data in a form understood by the foreground application. In some embodiments, for example, application 328 sends to the foreground application one or more messages that simulate user selection and movement of a horizontal scroll bar in the foreground application window. In the WINDOWS XP operating system, horizontal scroll movement can be simulated using a WM_HSCROLL message. Information about the WM_HSCROLL message is reproduced at Appendix E.

Activation of packet Switching

In at least some embodiments, a mouse providing horizontal scroll data, high-resolution vertical scroll data, and/or other forms of input not supported by a standard port driver must first be instructed to provide this data via packet switching. As described in commonly-owned application Ser. No. 10/420,039, a procedure known as "knocking" can be used to activate various reporting functions of a PS/2 mouse or other device. As explained in said application, standard PS/2 protocol and port drivers do not support specific commands to activate certain non-standard features. However, a PS/2 mouse or other input device can be programmed to recognize a specific sequence of pre-existing commands as a command to activate non-standard features. For example, the following sequence of commands are used in at least one embodiment to enable packet switching:

SET_MOUSE_SAMPLING_RATE 200
SET_MOUSE_SAMPLING_RATE 80
SET_MOUSE_SAMPLING_RATE 40

Additional knocks for activating or deactivating other features (e.g., for reporting battery status, signal strength, etc.) can precede or follow a knock to enable packet switching. In at least some embodiments, knocks for activating packet switching and other features occur during the boot or restart process for a computer. As part of booting (or restarting), the filter driver (and other operating system components) are loaded, and the mouse is reset. The filter driver determines that the mouse has completed resetting based on parameters received from port driver 308 during calls to the ISR callback routine of filter driver 308. In particular, when MOUSE_STATE equals MouseResetting and MOUSE_RESET_SUBSTATE points to a reset substate value of ExpectingEnableACK, the appropriate routine(s) for executing the knock are run.

Conclusion

As illustrated by the foregoing description, embodiments of the invention thus provide a mechanism by which a standard PS/2 data packet can be used, in conjunction with an existing PS/2 port driver, to process input data which the driver was not designed to support. Some of this data (e.g., horizontal scroll data) may also unsupported by other operating system components. By use of a filter driver program and/or an accompanying user-level application program, this unsupported input data can be provided to user-level applications. Many of these applications may be older applications which do not recognize the unsupported input in the form provided by the PS/2 device. Embodiments of the invention allow newer input devices to communicate using a PS/2 interface without expensive and elaborate revision of numerous operating system components. Instead, a comparatively less-involved and less expensive filter driver and/or user-level application are used, each of which interfaces with other operating system components and applications using pre-existing hooks, functions and other interfaces.

As previously indicated, the invention is not limited to communication via a PS/2 protocol. The methods described herein can also be used for communication of input data via other types of communication interfaces which may not recognize the communicated data.

As can be appreciated in light of the foregoing description, other embodiments of the invention can be used for processing still other types of input not supported by an existing port driver or other operating system components, and/or which older application programs may not recognize in certain forms. As but one example, rotating a mouse clockwise could cause all windows to minimize. Similarly, other fields of a PS/2 data packet could be used. Indeed, other standard PS/2 packet formats could be adapted. As previously indicated, there are additional standard PS/2 data packet formats for a two-button mouse without a scroll wheel and for a three-button mouse with a scroll wheel. The invention could be implemented in connection with a standard port driver and other software components configured to process one of these other standard packet formats.

Although specific examples of carrying out the invention have been described, those skilled in the art will appreciate that there are numerous other variations and permutations of the above described systems and techniques that fall within the spirit and scope of the invention as set forth in the appended claims. These and other modifications are within the scope of the invention as defined by the attached claims.

Appendix A

```
typedef struct MOUSE_INPUT_DATA {
    USHORT   UnitId;
    USHORT   Flags;
    union {
        ULONG   Buttons;
        struct {
            USHORT   ButtonFlags;
            USHORT   ButtonData;
        };
    };
    ULONG   RawButtons;
    LONG    LastX;
    LONG    LastY;
    ULONG   ExtraInformation;
} MOUSE_INPUT_DATA, *PMOUSE_INPUT_DATA;
```

Members:

UnitId

Not used.

Flags

Specifies a bitwise OR of one or more of the following mouse indicator flags.

| Value | Meaning |
| --- | --- |
| MOUSE_MOVE_RELATIVE | The LastX and LastY are set relative to the previous location. |
| MOUSE_MOVE_ABSOLUTE | The LastX and LastY values are set to absolute values. |
| MOUSE_VIRTUAL_DESKTOP | The mouse coordinates are mapped to the virtual desktop. |
| MOUSE_ATTRIBUTES_CHANGED | The mouse attributes have changed. The other data in the structure is not used. |

Buttons

Specifies both ButtonFlags and ButtonData values. Mouclass uses Buttons in its interrupt service routine to do a fast single memory access to ButtonFlags and ButtonData.

ButtonFlags
  Specifies the transition state of the mouse buttons.

| Flag | Meaning |
| --- | --- |
| MOUSE_LEFT_BUTTON_DOWN | The left mouse button changed to down. |
| MOUSE_LEFT_BUTTON_UP | The left mouse button changed to up. |
| MOUSE_RIGHT_BUTTON_DOWN | The right mouse button changed to down. |
| MOUSE_RIGHT_BUTTON_UP | The right mouse button changed to up. |
| MOUSE_MIDDLE_BUTTON_DOWN | The middle mouse button changed to down. |
| MOUSE_MIDDLE_BUTTON_UP | The middle mouse button changed to up. |
| MOUSE_BUTTON_4_DOWN | The fourth mouse button changed to down. |
| MOUSE_BUTTON_4_UP | The fourth mouse button changed to up. |
| MOUSE_BUTTON_5_DOWN | The fifth mouse button changed to down. |
| MOUSE_BUTTON_5_UP | The fifth mouse button changed to up. |
| MOUSE_WHEEL | Mouse wheel data is present. |

ButtonData
  Specifies mouse wheel data, if MOUSE_WHEEL is set in ButtonFlags.

RawButtons
  Specifies the raw state of the mouse buttons. The Win 32 subsystem does not use this member.

Lastx
  Specifies the signed relative or absolute motion in the x direction.

LastY
  Specifies the signed relative or absolute motion in the y direction.

ExtraInformation
  Specifies device-specific information.

Headers:
  Declared in ntddmou.h. Include ntddmou.h.

Comments:
  In response to IRP_MJ_READ requests, Mouclass transfers zero or more MOUSE_INPUT_DATA structures from its internal data queue to the Microsoft Win 32 subsystem buffer.

[additional information available at http://msdn.microsoft.com]

Appendix B

```
BOOLEAN
    MouFilter_IsrHook(
        IN PDEVICE_OBJECT    DeviceObject,
        IN PMOUSE_INPUT_DATA CurrentInput,
        IN POUTPUT_PACKET    CurrentOutput,
        IN UCHAR    StatusByte,
        IN OUT PUCHAR   DataByte,
        OUT PBOOLEAN    ContinueProcessing,
        IN PMOUSE_STATE    MouseState,
        IN PMOUSE_RESET_SUBSTATE    ResetSubState
        );
```

Parameters:

Deviceobject
  Pointer to the filter device object of the driver that supplies this callback.

CurrentInput
  Pointer to the input MOUSE_INPUT_DATA structure being constructed by the ISR.

CurrentOutput
  Pointer to the OUTPUT_PACKET structure that specifies the bytes being written to the hardware device.

StatusByte
  Specifies a status byte that is read from I/O port 60 when the interrupt occurs.

DataByte
  Specifies a data byte that is read from I/O port 64 when the interrupt occurs.

ContinueProcessing
  Specifies, if TRUE, that the I8042prt mouse ISR continues processing after this callback returns. Otherwise, processing is not continued.

MouseState
  Pointer to a MOUSE_STATE enumeration value, which identifies the state of mouse input.

Reset SubState
  Pointer to MOUSE_RESET_SUBSTATE enumeration value, which identifies the a mouse reset substate. See the Comments section.

Return Value:
  MouFilter_IsrHook returns TRUE if the interrupt service routine should continue; otherwise it returns FALSE.

Headers:
  Declared in moufiltr.h. Include moufiltr.h

Comments:
  The I8042prt mouse ISR calls MouFilter_IsrHook after it validates the interrupt.
  To reset a mouse, I8042prt goes through a sequence of operational substates, each one of which is identified by an MOUSE_RESET_SUBSTATE enumeration value. For more information about how I8042prt resets a mouse and the corresponding mouse reset substates, see the I8042prt sample code provided in the DDK and the documentation of MOUSE_RESET_SUBSTATE in ntdd8042. h.
  MouFilter_IsrHook runs in kernel mode at the IRQL of the I8042prt mouse ISR.

[additional information available at http://msdn.microsoft.com]

Appenix C

```
typedef enum _MOUSE_STATE {
    MouseIdle,
    XMovement,
    YMovement,
    ZMovement,
    MouseExpectingACK,
    MouseResetting
} MOUSE_STATE, *PMOUSE_STATE;
```

Enumerators:

MouseIdle
Indicates that the next input byte from a mouse should be a status byte that specifies the button state and the sign and overflow bits for the x and y movement.

XMovement
Indicates that the next input byte from a mouse should be a byte that specifies movement data in the x-direction.

YMovement
Indicates that the next input byte from a mouse should be a byte that specifies movement data in the y-direction.

ZMovement
Indicates that that the next input byte from a mouse should be a byte that specifies movement data in the z-direction (generated by a wheel mouse).

MouseExpectingACK
Indicates that the next input byte from a mouse should be an acknowledgment from an enable mouse command.

MouseResetting
Indicates that I8042prt is resetting the mouse.

Headers:
Declared in ntdd8042. h. Include ntdd8042. h.

[additional information available at http://msdn.microsoft.com]

Appendix D

```
BOOL DeviceIoControl(
    HANDLE hDevice,
    DWORD dwIoControlCode,
    LPVOID lpInBuffer,
    DWORD nInBufferSize,
    LPVOID lpOutBuffer,
    DWORD nOutBufferSize,
    LPDWORD lpBytesReturned,
    LPOVERLAPPED lpOverlapped
);
```

Parameters:

hdevice
[in] Handle to the device on which the operation is to be performed. The device is typically a volume, directory, file, or stream. To retrieve a device handle, use the CreateFile function. For more information, see Remarks.

dwIoControlCode
[in] Control code for the operation. This value identifies the specific operation to be performed and the type of device on which to perform it.
. . . The documentation for each control code provides usage details for the lpInBuffer, nInBufferSize, lpOutBuffer, and nOutBufferSize parameters.

lpInBuffer
[in] Pointer to the input buffer that contains the data required to perform the operation. The format of this data depends on the value of the dwIoControlCode parameter.
This parameter can be NULL if dwIoControlCode specifies an operation that does not require input data.

nInBufferSize
[in] Size of the input buffer, in bytes.

lpOutBuffer
[out] Pointer to the output buffer that is to receive the data returned by the operation. The format of this data depends on the value of the dwIoControlCode parameter.
This parameter can be NULL if dwIoControlCode specifies an operation that does not return data.

nOutBufferSize
[in] Size of the output buffer, in bytes.

lpBytesReturned
[out] Pointer to a variable that receives the size of the data stored in the output buffer, in bytes.
If the output buffer is too small to receive any data, the call fails, GetLastError returns ERROR_INSUFFICIENT_BUFFER, and lpBytesReturned is zero.
If the output buffer is too small to hold all of the data but can hold some entries, some drivers will return as much data as fits. In this case, the call fails, GetLastError returns ERROR_MORE_DATA, and lpBytesReturned indicates the amount of data received. Your application should call DeviceIocontrol again with the same operation, specifying a new starting point.
If lpOverlapped is NULL, lpBytesReturned cannot be NULL. Even when an operation returns no output data and lpOutBuffer is NULL, DeviceIoControl makes use of lpBytesReturned. After such an operation, the value of lpBytesReturned is meaningless.
If lpOverlapped is not NULL, lpBytesReturned can be NULL. If this parameter is not NULL and the operation returns data, lpBytesReturned is meaningless until the overlapped operation has completed. To retrieve the number of bytes returned, call GetOverlappedResult. If hDevice is associated with an I/O completion port, you can retrieve the number of bytes returned by calling GetQueuedCompletionStatus.

lpOverlapped
[in] Pointer to an OVERLAPPED structure.
If hdevice was opened without specifying FILE_FLAG_OVERLAPPED, lpOverlapped is ignored.
If hDevice was opened with the FILE_FLAG_OVERLAPPED flag, the operation is performed as an overlapped (asynchronous) operation. In this case, lpOverlapped must point to a valid OVERLAPPED structure that contains a handle to an event object. Otherwise, the function fails in unpredictable ways.
For overlapped operations, DeviceIoControl returns immediately, and the event object is signaled when the operation has been completed. Otherwise, the function does not return until the operation has been completed or an error occurs.

Return Values:
If the function succeeds, the return value is nonzero.
If the function fails, the return value is zero.

[additional information available at http://msdn.microsoft.com]

Appendix E

WM_HSCROLL
    WPARAM wParam
    LPARAM lParam;

Parameters:

wParam
The low-order word specifies a scroll bar value that indicates the user's scrolling request. This word can be one of the following values.

The high-order word specifies the current position of the scroll box if the low-order word is SB_THUMBPOSITION or SB_THUMBTRACK; otherwise, this word is not used.

SB_ENDSCROLL
Ends scroll.
SB_LEFT
Scrolls to the upper left.
SB_RIGHT
Scrolls to the lower right.
SB_LINELEFT
Scrolls left by one unit.
SB_LINERIGHT
Scrolls right by one unit.
SB_PAGELEFT
Scrolls left by the width of the window.
SB_PAGERIGHT
Scrolls right by the width of the window.
SB_THUMBPOSITION
The user has dragged the scroll box (thumb) and released the mouse button. The high-order word indicates the position of the scroll box at the end of the drag operation.
SB_THUMBTRACK
The user is dragging the scroll box. This message is sent repeatedly until the user releases the mouse button. The high-order word indicates the position that the scroll box has been dragged to.

lParam
If the message is sent by a scroll bar, then this parameter is the handle to the scroll bar control. If the message is not sent by a scroll bar, this parameter is NULL.

Return Value:
If an application processes this message, it should return zero.

[additional information available at http://msdn.microsoft.com]

The invention claimed is:

1. A method for processing data received from an input device through an interface, comprising:
   (a) examining one or more bytes of a PS/2 data packet received by a port driver;
   (b) detecting the presence within the PS/2 data packet of data not recognized by the port driver;
   (c) storing the unrecognized data from the PS/2 data packet;
   (d) replacing the portion of the PS/2 data packet containing the unrecognized data with a substitute value;
   (e) receiving a data structure created from the PS/2 data packet, the data structure containing a value corresponding to the substitute value;
   (f) retrieving the stored data upon detecting the data structure value corresponding to the substitute value; and
   (g) providing input data to at least one application program based on the retrieved data,
and wherein
   steps (a) through (g) are carried out by a filter driver in data communication with the port driver,
   the filter driver is in data communication with a third driver,
   the third driver is in data communication with the port driver,
   the third driver receives data from the PS/2 data packet and the substitute value, and
   the third driver provides the data structure to the filter driver.

2. The method of claim 1, wherein the unrecognized data comprises input data inserted into a portion of the PS/2 data packet reserved for a specific data type, and wherein the port driver does not recognize the inserted data as being distinct from the specific data type.

3. The method of claim 1, wherein step (a) comprises examining one or more bytes containing a flag indicating the presence within the PS/2 data packet of unrecognized data.

4. The method of claim 1, wherein the unrecognized data comprises horizontal scrolling data from a computer mouse.

5. The method of claim 4, further comprising repeating steps (a) through (g) for a second PS/2 data packet containing a second type of unrecognized data, wherein the second type of unrecognized data comprises high resolution vertical scroll data.

6. The method of claim 4, wherein step (g) comprises providing horizontal scroll data to a first application program which provides horizontal scroll information to a second application program.

7. A method for processing data received from an input device through an interface, comprising:
   (a) examining one or more bytes of a PS/2 data packet received by a port driver;
   (b) detecting the presence within the PS/2 data packet of data not recognized by the port driver, wherein the unrecognized data comprises horizontal scrolling data from a computer mouse;
   (c) storing the unrecognized data from the PS/2 data packet;
   (d) replacing the portion of the PS/2 data packet containing the unrecognized data with a substitute value;
   (e) receiving a data structure created from the PS/2 data packet, the data structure containing a value corresponding to the substitute value;
   (f) retrieving the stored data upon detecting the data structure value corresponding to the substitute value;
   (g) providing input data to at least one application program based on the retrieved data; and
   (h) repeating steps (a) through (g) for a second PS/2 data packet containing a second type of unrecognized data, wherein the second type of unrecognized data comprises high resolution vertical scroll data,
and wherein
   the filter driver is in data communication with a third driver,
   the third driver is in data communication with the port driver,
   the third driver receives data from the PS/2 data packet and the substitute value,
   the third driver provides the data structure to the filter driver,
   performance of step (g) with regard to the high resolution vertical scroll data comprises insertion into the data structure of a value based upon the high resolution vertical scroll data, and
   performance of step (g) with regard to the horizontal scroll data comprises providing to an application program, independent of the data structure, a value based upon the horizontal scroll data.

8. A computer-readable storage medium having stored thereon data instructions which, when executed by a processor, cause the processor to perform steps comprising:
   (a) examining one or more bytes of a PS/2 data packet received by a port driver;

(b) detecting the presence within the PS/2 data packet of data not recognized by the port driver;

(c) storing the unrecognized data from the PS/2 packet;

(d) replacing the portion of the PS/2 data packet containing the unrecognized data with a substitute value;

(e) receiving a data structure created from the PS/2 data packet, the data structure containing a value corresponding to the substitute value;

(f) retrieving the stored data upon detecting the data structure value corresponding to the substitute value; and (g) providing input data to at least one application program based on the retrieved data, and wherein steps (a) through (g) are carried out by a filter driver in data communication with the port driver, the filter driver is in data communication with a third driver, the third driver is in data communication with the port driver, the third driver receives data from the PS/2 data packet and the substitute value, and the third driver provides the data structure to the filter driver.

9. The computer-readable storage medium of claim 8, wherein the unrecognized data comprises input data inserted into a portion of the PS/2 data packet reserved for a specific data type, and wherein the port driver does not recognize the inserted data as being distinct from the specific data type.

10. The computer-readable storage medium of claim 8, wherein step (a) comprises examining one or more bytes containing a flag indicating the presence within the PS/2 data packet of unrecognized data.

11. The computer-readable storage medium of claim 8, wherein the unrecognized data comprises horizontal scrolling data from a computer mouse.

12. The computer-readable storage medium of claim 11, comprising additional instructions which, when executed by a processor, cause the processor to perform additional steps comprising repeating steps (a) through (g) for a second PS/2 data packet containing a second type of unrecognized data, wherein the second type of unrecognized data comprises high resolution vertical scroll data.

13. The computer-readable storage medium of claim 11, wherein step (g) comprises providing horizontal scroll data to a first application program which provides horizontal scroll information to a second application program.

14. A computer-readable storage medium having stored thereon data instructions which, when executed by a processor, cause the processor to perform steps comprising:

(a) examining one or more bytes of a PS/2 data packet received by a port driver;

(b) detecting the presence within the PS/2 data packet of data not recognized by the port driver, wherein the unrecognized data comprises horizontal scrolling data from a computer mouse;

(c) storing the unrecognized data from the PS/2 data packet;

(d) replacing the portion of the PS/2 data packet containing the unrecognized data with a substitute value;

(e) receiving a data structure created from the PS/2 data packet, the data structure containing a value corresponding to the substitute value;

(f) retrieving the stored data upon detecting the data structure value corresponding to the substitute value;

(g) providing input data to at least one application program based on the retrieved data; and (h) repeating steps (a) through (g) for a second PS/2 data packet containing a second type of unrecognized data, wherein the second type of unrecognized data comprises high resolution vertical scroll data, and wherein the filter driver is in data communication with a third driver, the third driver is in data communication with the port driver, the third driver receives data from the PS/2 data packet and the substitute value, the third driver provides the data structure to the filter driver, performance of step (g) with regard to the high resolution vertical scroll data comprises insertion into the data structure of a value based upon the high resolution vertical scroll data, and performance of step (g) with regard to the horizontal scroll data comprises providing to an application program, independent of the data structure, a value based upon the horizontal scroll data.

* * * * *